(12) United States Patent
Sivakumar et al.

(10) Patent No.: US 12,548,298 B2
(45) Date of Patent: Feb. 10, 2026

(54) GENERATING GRAPHICAL EXPLANATIONS OF MACHINE LEARNING PREDICTIONS

(71) Applicant: International Business Machines Corporation, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 405 days.

(21) Appl. No.: 17/993,648

(22) Filed: Nov. 23, 2022

(65) Prior Publication Data
US 2024/0169697 A1    May 23, 2024

(51) Int. Cl.
*G06V 10/00* (2022.01)
*G06V 10/774* (2022.01)
*G06V 10/82* (2022.01)

(52) U.S. Cl.
CPC ............ *G06V 10/774* (2022.01); *G06V 10/82* (2022.01)

(58) Field of Classification Search
CPC .............................. G06V 10/774; G06V 10/82
See application file for complete search history.

(56) References Cited

U.S. PATENT DOCUMENTS

| | | | |
|---|---|---|---|
| 9,495,127 B2 | 11/2016 | Ballinger et al. | |
| 9,836,455 B2 | 12/2017 | Martens et al. | |
| 10,719,742 B2 | 7/2020 | Shechtman et al. | |
| 11,928,185 B2 * | 3/2024 | Malur Srinivasan | G06F 18/214 |
| 2021/0056347 A1 | 2/2021 | Sbodio et al. | |
| 2021/0142169 A1 | 5/2021 | De et al. | |
| 2022/0335041 A1 * | 10/2022 | Kwatra | G06F 18/23213 |
| 2022/0398460 A1 * | 12/2022 | Dalli | G06F 18/2163 |

(Continued)

FOREIGN PATENT DOCUMENTS

CN        103959283        12/2016

OTHER PUBLICATIONS

Vilone et al, explainable AI: a systemic review arXiv 2006.00093v4 12 Cct (Year: 2020).*

(Continued)

*Primary Examiner* — Xiao Liu

(74) *Attorney, Agent, or Firm* — Garg Law Firm, PLLC; Rakesh Garg; Steven Bouknight

(57) ABSTRACT

Query data associated with a query is detected, where the query data includes an active feature and a passive attribute used in a machine learning model, and where the machine learning model is trained to output a predicted result based at least in part on the active feature. Using a first trained neural network, a digital image is generated based at least in part on the passive attribute, and from the machine learning model outcome narrative data indicative of an explanation of the predicted result and based at least in part on the active feature is also generated. Then, using an image generator, a graphical explanation of the predicted result is generated, the graphical explanation being based at least in part on the outcome narrative data and the digital image.

20 Claims, 9 Drawing Sheets

(56) References Cited

U.S. PATENT DOCUMENTS

2023/0359824 A1* 11/2023 Lu .................. G06F 40/295

OTHER PUBLICATIONS

Diaz-Rodriguez et al., Explainable Neural-Symbolic Learning (X-NeSyL) methodology to fuse deep learning representations with expert knowledge graphs: The MonuMAI cultural heritage use case, Information Fusion, vol. 79, pp. 58-83 (Year: 2022).*
Confalonieri et al., A Historical Perspective of Explainable Artificial Intelligence, Sep. 21, 2020.
Diaz-Rodriguez et al., Explainable Neural-Symbolic Learning (X-NeSyL) methodology to fuse deep learning representations with expert knowledge graphs: The MonuMAI cultural heritage use case, Sep. 21, 2021.
Sarkar, Google's New Explainable AI (xAI) service, Nov. 25, 2019, https://towardsdatascience.com/googles-new-explainable-ai-xai-service-83a7bc823773.
Google, Recognize Speech by Using Enhanced Models, 2022, https://cloud.google.com/speech-to-text/docs/enhanced-models.
Zeng et al., Speech recognition with amplitude and frequency modulations, National Academy of Sciences, vol. 102, No. 7, Feb. 15, 2005.
IBM, AI Explainability 360, 2022, https://aix360.mybluemix.net/.

* cited by examiner

GENERATING GRAPHICAL EXPLANATIONS OF MACHINE LEARNING PREDICTIONS

BACKGROUND

The present invention relates generally to computer system security. More particularly, the present invention relates to a method, system, and computer program for securing sensitive debug data.

Artificial intelligence (AI) technology has evolved significantly over the past few years. Modern AI systems include machine learning systems that are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is an example of a machine learning system that is often used for performing data classification tasks. ANNs are processing devices (algorithms and/or hardware) that are made up of a number of highly interconnected processing elements (nodes) that process information by their dynamic state response to external inputs. ANNs are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

A machine learning system that performs data classification is sometimes referred to as a classifier. A classifier is a type of ANN that includes an algorithm that learns a function that separates two or more classes of data. There are many different types of classifiers. Examples include image classifiers that classify images based on what is being depicted (e.g., classifying images as depicting a cat or a dog) and sentiment classifiers that classify text based on what is being expressed (e.g., classifying text as expressing a positive or negative opinion).

A feedforward neural network is an ANN in which connections between the units do not form a cycle. A convolutional neural network (CNN) is an example of a feed-forward ANN that is sometimes used as a classifier. In a CNN, the connectivity pattern between the nodes (neurons) is inspired by the organization of the animal visual cortex, whose individual neurons are arranged to respond to overlapping regions tiling a visual field. As a result, CNNs are particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image, for tasks such as image classification.

A recurrent neural network (RNN) is another example of a type of ANN that is sometimes used as a classifier. An RNN includes recurrent connections (i.e., feedback connections) that form cycles in the network's topology. In an RNN, a neuron feeds back information to itself in addition to passing it to the next neuron in the RNN. Computations derived from earlier inputs are fed back in the network, which gives an RNN a form of short-term memory. Feedback networks, such as RNNs, are dynamic in that the state of an RNN is continuously changing until it reaches an equilibrium point. For this reason, RNNs are particularly well-suited for detecting relationships across time in a given set of data. Long-Short Term Memory (LSTM) and Gated Recurrent Units (GRU) are types of RNNs that include a state-preserving mechanism through built-in memory cells. These types of RNNs are particularly well-suited for multivariate time series data analysis and forecasting, handwriting recognition, natural language processing, and task synthesis.

A deep neural network (DNN) is another example of an ANN that is sometimes used as a classifier. A DNN has multiple hidden layers of units between the input and output layers. Similar to shallow ANNs, DNNs can model complex non-linear relationships. DNN architectures generate compositional models where the object is expressed as a layered composition of image primitives. The extra layers enable composition of features from lower layers, allowing for the potential of modeling complex data with fewer units than a similarly performing shallow ANN.

In addition to neural networks, there are numerous other machine learning algorithms that are widely used in various applications. Some common examples include linear regression, logistic regression, and support vector machines (SVMs). Linear regression tries to fit a function to a set of input data points and is often used to project values, such as a future asset value or future price of a product. Logistic regression also tries to fit a function to a set of data points but is typically used to classify data by predicting the likelihood of a data point belonging to a certain class. SVMs are used for both regression and classification, for example by fitting a hyperplane to datapoints and then classifying additional data points based on where they exist relative to the hyperplane. These are but a few examples of the many different machine learning algorithms in use today.

SUMMARY

The illustrative embodiments provide for generating graphical explanations of machine learning predictions. An embodiment includes detecting query data associated with a query, where the query data comprises an active feature and a passive attribute used in a machine learning model, and the machine learning model is trained to output a predicted result based at least in part on the active feature. The embodiment also includes generating, using a first trained neural network, a digital image based at least in part on the passive attribute. The embodiment also includes generating, from the machine learning model, outcome narrative data indicative of an explanation of the predicted result and based at least in part on the active feature. The embodiment also includes generating, using an image generator, a graphical explanation of the predicted result, the graphical explanation being based at least in part on the outcome narrative data and the digital image. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
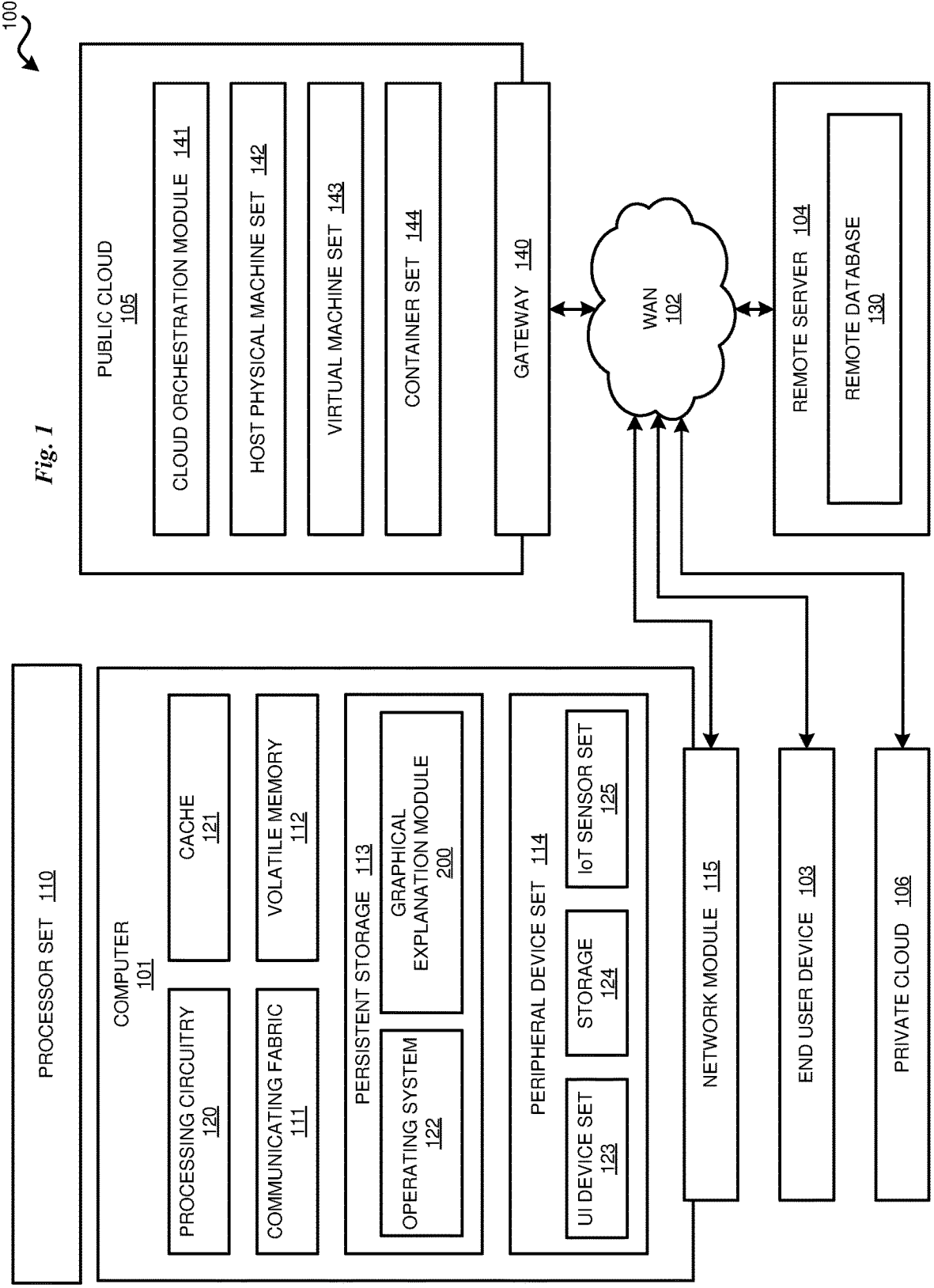
FIG. 1 depicts a block diagram of a computing environment in accordance with an illustrative embodiment.

In recent years, machine learning (ML) models of various types, such as various types of ANNs discussed above, have demonstrated the ability to make remarkably accurate predictions and have emerged as the state-of-the-art in machine learning models. ML models now exist that outperform other methods in several areas, including applications involving image recognition, such as computer vision and image classification. This translates to tremendous potential for the use of ML models in many different industries, including the medical and transportation industries.

For example, ML models exist that show promise for applications such as medical imaging and self-driving vehicles. However, the benefit of several ML models, particularly those that are very complex such as the various types of ANNs, is currently seen as coming with some amount of risk due to the difficulty involved in understanding how exactly such ML models arrive at their predictions. This is sometimes referred to as the "black box" problem of some of the more complex ML models: while they consistently demonstrate amazing accuracy, there remains a degree of mistrust because the predictions are based on a process that is not readily understood.

For example, in the medical industry, DNNs have outperformed human counterparts at evaluating medical imagery or developing care plans based on lengthy patient records. However, the illustrative embodiments recognize that if a physician reviewing the DNN's prediction has no way of understanding the reasoning that led to the conclusion, it becomes difficult for the physician to decide how much confidence to place on the DNN's prediction.

Thus, the illustrative embodiments recognize that mistrust due to an absence of explanation for ML model predictions presents an obstacle to adoption of such ML models, particularly in areas like medical and transportation applications where health and safety are put at risk if predictions are wrong. The illustrative embodiments recognize that there is a need to improve the transparency of machine-learning based decision-making by providing humanly interpretable explanations of predictions made by ML models.

For example, a physician reviewing a prediction made by a DNN of whether a medical image indicates a medical condition has only the inscrutable prediction of the DNN and therefore cannot be certain whether it was a close call or which areas of the image most contributed to the DNN's prediction. Without the ability to understand the rationale behind the DNN's prediction, the physician's decision-making ability might be hampered or adversely altered. For example, the physician might ordinarily err on the side of caution and treat a close negative result but fail to do so when not aware of the close, and therefore potentially erroneous, nature of a prediction made by the DNN.

Understanding why a DNN made one particular prediction instead of another is also important in developing future machine learning models. For example, a DNN classifier that is making erroneous predictions can be difficult to troubleshoot with only the erroneous inscrutable prediction. In a case where the errors stem from an adversarial attack on the DNN, the rationale for the erroneous decision might aid in better understanding the nature of the adversarial attack and how to defend from such an attack in the future.

In addition, ML models have the potential to improve many different security applications, such as at airports or other secure areas. For example, a ML models have shown potential for security applications such as facial recognition, retina scanning, and biometric scanning. Security applications such as these present challenges due to the potential threat of adversarial attacks or other attempts to bypass security by causing the DNN to make erroneous predictions. The rationale of the DNN that is contributing to the erroneous predictions can help improve the robustness of such systems to make such attacks more difficult.

The illustrative embodiments recognize that the presently available tools or solutions do not address these needs or provide adequate solutions for these needs. The illustrative embodiments used to describe the invention generally address and solve the above-described problems and other problems related to improving the transparency of DNN decision-making by providing humanly interpretable explanations of predictions made by ML models.

The illustrative embodiments recognize that generally many machine learning algorithms do not provide information as to how and why the system reached a decision and can be considered as unexplainable models. The illustrative embodiments recognize that understanding and interpreting decisions reached by machine learning algorithms provides additional information and allows for verification of the system. Some machine learning models provide explanations and can be defined as explainable models. Examples of unexplainable models are neural networks, deep neural networks, convolutional neural networks and hierarchical temporal memory. Examples of explainable models are decision trees, rule engines, and linear regression models.

The illustrative embodiments used to describe the invention generally address and solve the above-described problems and other problems related to explaining and interpreting machine learning algorithms. The illustrative embodiments provide a method, system, and computer program product for generating result explanation for neural networks.

An embodiment can be implemented as a software application. The application implementing an embodiment can be configured as a modification of an existing image analysis system, as a separate application that operates in conjunction with an existing image analysis system, a standalone application, or some combination thereof.

In an illustrative embodiment, a graphical-explanation generation process detects a user query of machine learning model-based system. In some embodiments, the process collects base input data associated with user query and ML model. This input information comprises active attribute values (i.e., attributes that are considered by the ML model for decision making), ML model functions, dimensions, training corpus used to make the decisions, etc. Additionally, the ML model platform has passive attributes that are not considered by the ML model. The process collects the passive attributes and uses the passive attributes to provide contextual clarification when generating a graphical illustration symbolizing aspects of a ML model predictive result.

In some embodiments, the process maps input data to model result data and associated feature importance values. In some embodiments, the process generates explanatory data that identifies active features of the query that contributed to the predictive result. In some embodiments, the explanatory data identifies one or more of the active features of the query that most strongly contributed to the results from the ML model. In some embodiments, explanation algorithms can be used to determine features that caused the ML model to predict a particular result (e.g., using open-source Python libraries such as LIME (Local Interpretable Model-agnostic Explanations) or SHAP (SHapley Additive exPlanation)) (Python is a trademark of Python Software Foundation Corporation Delaware).

In some embodiments, the process collects passive attributes associated with the user query. In some embodiments, the process forms clusters of related features/attributes.

In some embodiments, the process generates correlation data indicative of correlations between features/attributes in the clusters. partitions the user query data (i.e., the active and passive attributes) into a plurality of clusters. In some embodiments, the process generates clusters that are essentially attribute clusters, The attribute clusters will ultimately (potentially) be used as narration categories for generating the graphical explanation for the ML model predictive result. In some embodiments, the clustering algorithm partitions the user query data using a machine learning clustering algorithm that forms clusters based on semantic correlations. There are various known clustering algorithms that may be used by the process, for example K-Means, K-Medians, Density-Based Spatial Clustering of Applications with Noise (DBSCAN), and Expectation-Maximization (EM) Clustering using Gaussian Mixture Models (GMM).

In some embodiments, the process inputs passive attributes and associated correlation data from clusters into a GAN generator. In some embodiments, the process uses the GAN discriminator to generate image elements associated with passive features that are consistent with ML model results. In some embodiments, the GAN generates the machine-generated digital image according to a process in which the GAN generator receives a passive attribute, a semantic correlation, and at least one actual digital image. In some such embodiments, the process includes using a noise generator to inject noise into the machine-generated image. In some such embodiments, the GAN generator generates a machine-generated digital image based on a combination of the actual digital image, the passive attribute, the semantic correlation, and the noise input.

In some such embodiments, the process provides the machine-generated digital image to the discriminator neural network of the GAN. In some such embodiments, the predicted result from the ML model is also provided to the discriminator module of the GAN. In some such embodiments, the discriminator module analyzes the predicted result and the machine-generated digital image and generates a context score for the machine-generated digital image. The context score is representative of an amount of correlation between the machine-generated digital image and a context of the predicted result. In some embodiments, the process compares the context score to a predetermined threshold value and either keeps or discards the machine-generated digital image based on whether the score meets the threshold requirement.

In some embodiments, the process uses a natural language processing engine to generate outcome narratives based on input important features and associated model results. In some embodiments, the process uses an image/animation generator to generate graphical explanation of ML results.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved secure debugging module 200 that prevents sensitive data from being leaked with debugging data. In addition to Graphical Explanation Module (GEM) 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and GEM 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in GEM 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in GEM 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
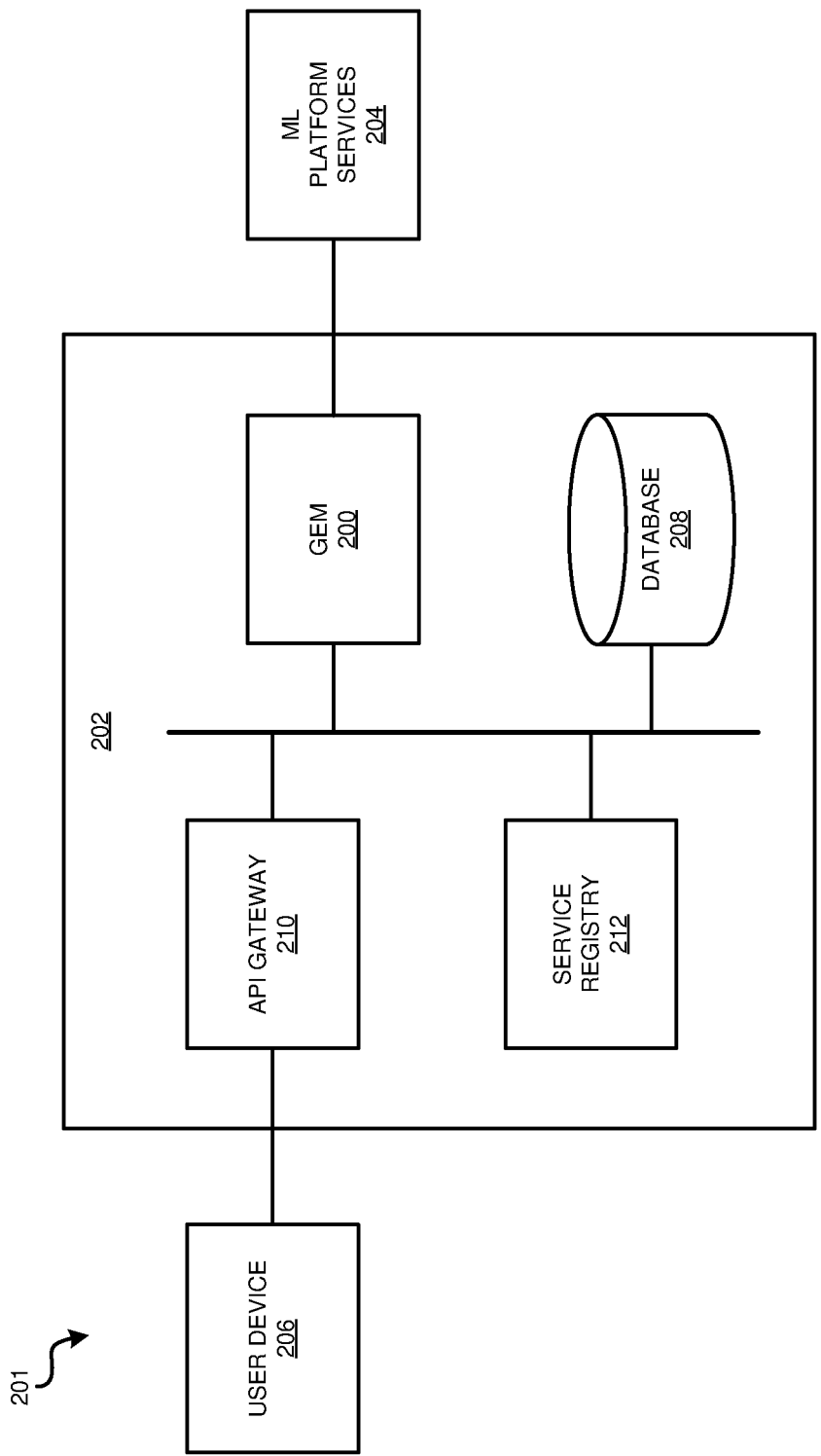
FIG. 2 depicts a block diagram of an example service infrastructure for a graphical explanation module in a distributed computing environment in accordance with an illustrative embodiment.

With reference to FIG. 2, this figure depicts a block diagram of an example service infrastructure 202 for a graphical explanation module 200 in a distributed computing environment 201 in accordance with an illustrative embodiment. In some embodiments, the service infrastructure 202 provides services and service instances to a user device 206. User device 206 communicates with service infrastructure 202 via an API gateway 210. In various embodiments, service infrastructure 202 and its associated graphical explanation module 200 serve multiple users and multiple tenants. A tenant is a group of users (e.g., a company) who share a common access with specific privileges to the software instance. Service infrastructure 202 ensures that tenant specific data is isolated from other tenants.

In some embodiments, user device 206 connects with API gateway 210 via any suitable network or combination of networks such as the Internet, etc. and uses any suitable communication protocols such as Wi-Fi, Bluetooth, etc. Service infrastructure 202 may be built on the basis of cloud computing. API gateway 210 provides access to client applications like graphical explanation module 200. API gateway 210 receives service requests issued by client applications and creates service lookup requests based on service requests. As a non-limiting example, in an embodiment, the user device 206 is a smartphone, a laptop, or other computing device. In some embodiments, the user device 206 accesses the graphical explanation module 200 via API gateway 210.

In the illustrated embodiment, service infrastructure 202 includes a service registry 212. In some embodiments, service registry 212 looks up service instances of graphical explanation module 200 in response to a service lookup request such as one from API gateway 210 in response to a service request from the user device 206. For example, in some embodiments, the service registry 212 looks up service instances of graphical explanation module 200 in response to requests from the user device 206 related to machine learning processes performed or managed by the ML platform services 204. In some embodiments, the graphical explanation module 200 monitors various machine learning processes performed or managed by the ML platform services ML platform services 204 by detecting queries and providing graphical explanations of the results.

In some embodiments, the service infrastructure 202 includes one or more instances of the graphical explanation module 200. In some such embodiments, each of the multiple instances of the graphical explanation module 200 run independently on multiple computing systems. In some such embodiments, graphical explanation module 200, as well as other service instances of graphical explanation module 200, are registered in service registry 212.

In some embodiments, service registry 212 maintains information about the status or health of each service instance including performance information associated each of the service instances. For example, such performance information may include several types of performance characteristics of a given service instance (e.g., cache metrics, etc.). In some embodiments, the extended service registry 212 ranks service instances based on their respective performance characteristics and selects top-ranking service instances for classification requests. In some such embodiments, in the event that a service instance becomes unresponsive or, unhealthy, the service registry will no longer provide its address or information about this service instance to other services.

Figure 3:
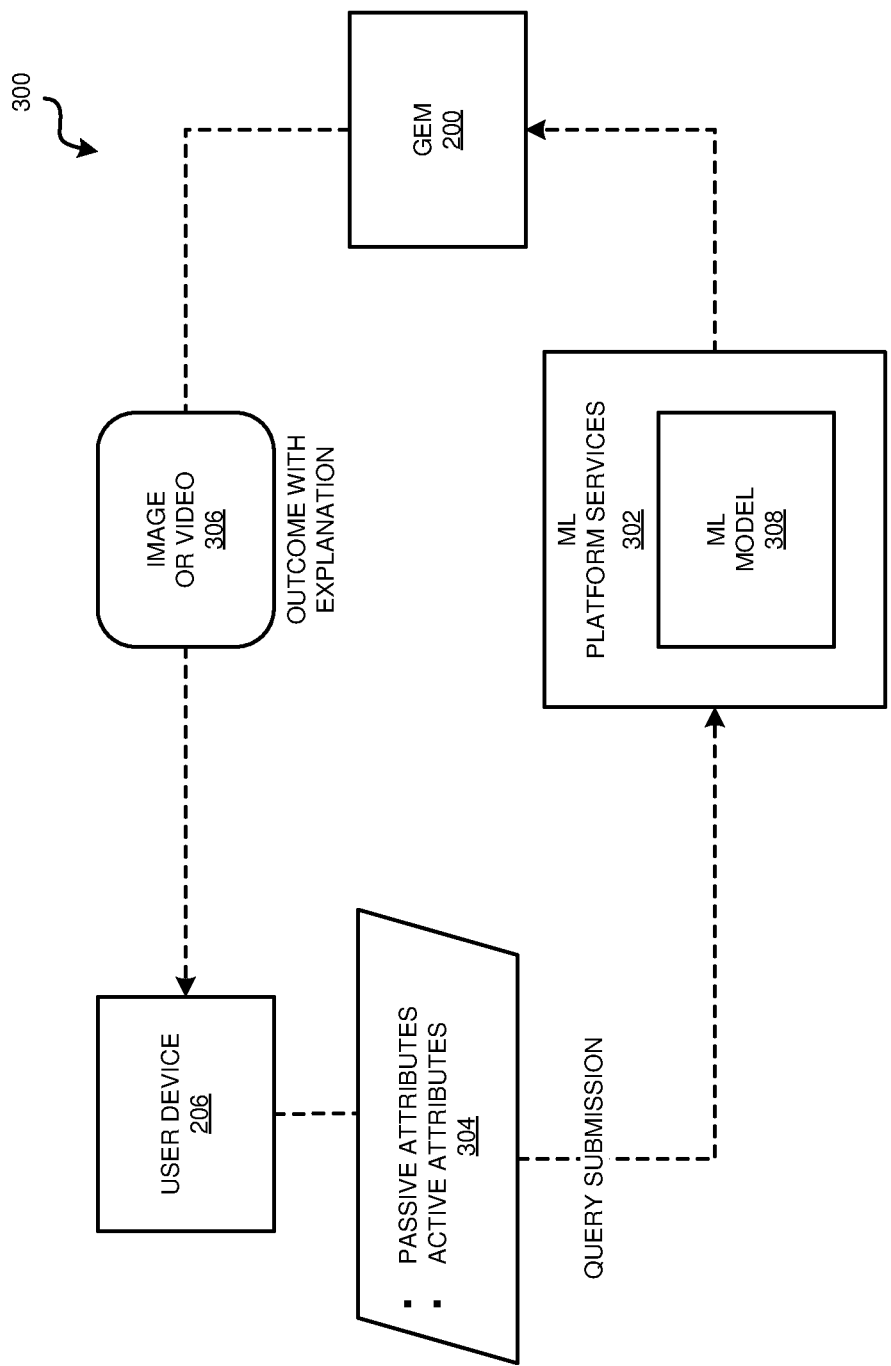
FIG. 3 depicts a block diagram of a data flow of a data generalization module in accordance with an illustrative embodiment.

With reference to FIG. 3, this figure depicts a block diagram of a data flow 300 of a data generalization module in accordance with an illustrative embodiment. In a particular embodiment, the ML platform services 302 shown in FIG. 3 is an example of the ML platform services 204 of FIG. 2.

In the illustrated embodiment, a user device 206 transmits a query submission 304 to the ML platform services 302, which initiates a query of a machine learning (ML) model 308. In the illustrated embodiment, the query submission 304 includes passive attributes (also referred to as passive features) and active attributes (also referred to as active features). A passive attribute (or passive feature) as referred to herein is an attribute or feature that is not used or considered by an ML model and therefore has no influence on the outcome (also referred to as predicted result) generated by the ML model. Passive attributes may include information collected by the ML platform services 302 from a user, for example for account personalization purposes, that is not used by the ML model 308. An active attribute (or active feature) as referred to herein is an attribute or feature that is used or considered by an ML model and therefore potentially has at least some influence on the outcome (also referred to as predicted result) generated by the ML model.

The ML model 308 processes the query submission and outputs a predicted result based on the active attributes. However, in some embodiments, the ML model 308 is a particularly complex model, such as a type of neural network. Due to the complexity of the ML model 308, it is difficult to understanding how exactly the ML model 308 arrived at the predicted result.

The illustrated embodiment addresses this problem by providing a graphical explanation module 200 that receives the predicted result from the ML model 308, along with other information about the ML model 308 itself. The graphical explanation module 200 uses this information to generate an image or video 306. The image or video 306 is transmitted to the user device 206 and serves as a graphical explanation of the predicted result.

Figure 4:
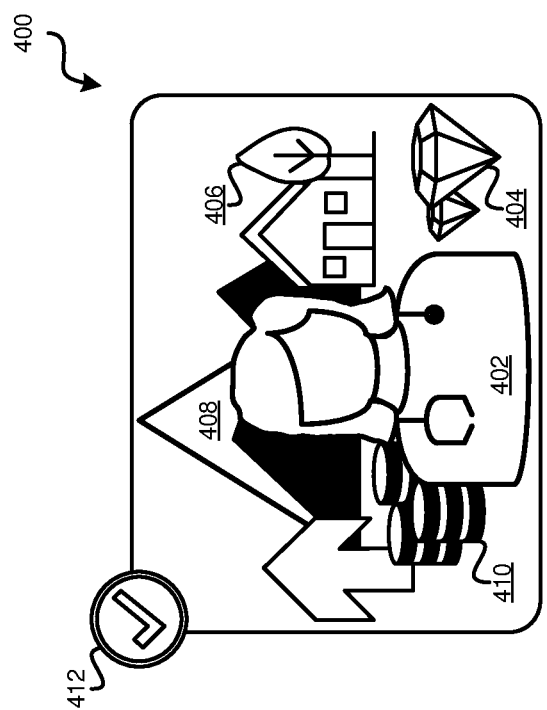
FIG. 4 depicts a non-limiting example of a graphical explanation generated by a graphical explanation module in accordance with an illustrative embodiment.

With reference to FIG. 4, this figure depicts a non-limiting example of a graphical explanation 400 generated by a graphical explanation module 200 in accordance with an illustrative embodiment. In some embodiments, the graphical explanation 400 is an example of the image or video 306 of FIG. 3.

The graphical explanation module 200 of FIG. 3 formulates the collected predicted response and ML model information into a single still image (graphical explanation 400) as shown in FIG. 4 or set of images that become frames of a video. The graphical explanation 400 is intended to provide a user with a clear representation of the basis of the ML model's decision combined with and the situational insights.

As a non-limiting example, in the case of the mortgage industry, an ML model may be used to determine if a loan application is, or is not, approved. In this case, the active attributes of the query submission 304 include information about the applicant that the lender has trained the ML model to consider when making a determination of whether to approve the loan, such as income level, assets, debts, and whether the applicant is currently a homeowner. The lender may also have additional information provided by the applicant in the form of passive attributes that are not used by the ML model, such as the applicant's state of residence and occupation.

In the example shown in FIG. 4, the graphical explanation 400 is an example of a graphical explanation for a loan approval that was output as a predicted result by an ML model. The graphical explanation 400 includes an image 402 based on passive attributes that depicts the applicant according to their occupation, which in the illustrated example has an occupation in a medical field. The graphical explanation 400 also includes an image 404 that is symbolic of an acceptably high level of fixed assets, an image 406 that is symbolic of the applicant being a current homeowner, an image 408 that is symbolic of the applicant's state of residence being in a mountain region, an image 410 that is symbolic of an acceptably high level of income, and an image 412 indicating an approval. Thus, in the example shown in FIG. 4, the graphical explanation 400 includes a graphical explanation depicting active attributes that contributed to the load approval (assets image 404, homeowner image 406, and income image 410), as well as depicting passive attributes somewhat related to the active attributes and providing additional contextual narrative to the graphical explanation (occupation image 402, and residence image 408). The graphical explanation 400 therefore allows the applicant to quickly understand the active attributes that were most influential in getting the loan approval.

Figure 5:
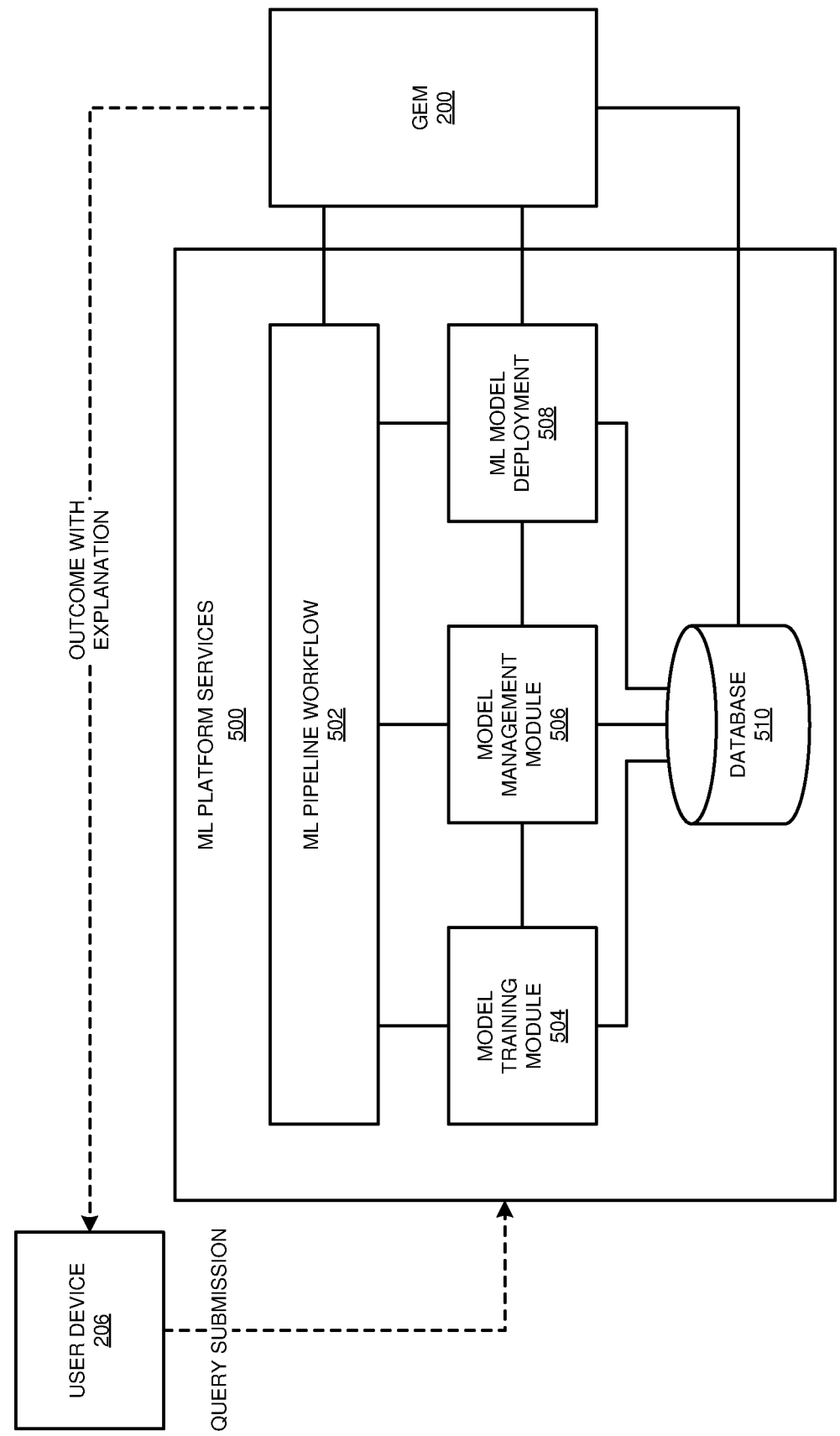
FIG. 5 depicts a functional block diagram of exemplary ML platform services in accordance with an illustrative embodiment.

With reference to FIG. 5, this figure depicts a functional block diagram of exemplary ML platform services 500 in accordance with an illustrative embodiment. In the illustrated embodiment, the ML platform services 500 is an example of the ML platform services 302 of FIG. 3.

In the illustrated embodiment, the ML platform services 500 includes a ML pipeline workflow 502, a model training module 504, a model management module 506, a ML model deployment 508, and a database 510. In alternative embodiments, the ML platform services 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. It will be appreciated that the ML platform services 500 shown in FIG. 5 is a simplified block diagram that is not intended to show every detail, and that the ML platform services 500 may have additional elements, such as additional ML pipeline components, for example for data ingestion and pre-processing.

In the illustrated embodiment, a ML pipeline workflow ML pipeline workflow 502 allows for Machine learning production workflows involving data movement between multiple sub-systems at data ingestion, preparation, training, and explaining. The ML pipeline workflow 502 manages tasks such as when data needs to be moved, massaged into the desired format before feeding into models for training and inference. In some embodiments, the ML pipeline workflow 502 notifies the graphical explanation module 200 of user queries and provides the graphical explanation module 200 with the predicted results from the ML model deployed as ML model deployment ML model deployment 508.

In the illustrated embodiment, the ML platform services 500 includes a model training module 504 includes one or more training model algorithms, which can be used repeatedly and alternatively as needed. The model training module 504 obtains the training configuration details a training dataset from a local database, a remote API (or service), or it is constructed during a data splitting stage. Once the model training module 504 sets the model, configurations, training parameters, and other elements, the model training module 504 stores them into a model candidate data repository in database 510. The database 510 is an example of a computer readable medium for non-volatile storage of data. In some embodiments, the graphical explanation module 200 may use information stored in the database 510 by the model training module 504 for generating a graphical explanation (e.g., graphical explanation 400 of FIG. 4).

In the illustrated embodiment, once an ML model is trained, the model management module 506 can catalog and track the trained model. For example, there may be times when changes are made to the ML model, so the model management module 506 can brain code versions, data versions, hyperparameters, and performance metrics in the database 510. In some embodiments, the graphical explanation module 200 may use information stored in the database 510 by the model management module 506 for generating a graphical explanation (e.g., graphical explanation 400 of FIG. 4).

In the illustrated embodiment, the trained ML model is deployed in a production state as indicated at ML model deployment 508. For example, in some embodiments, the ML model deployment 508 uses the trained ML model to serve as part of a live ML processing application.

Figure 6:
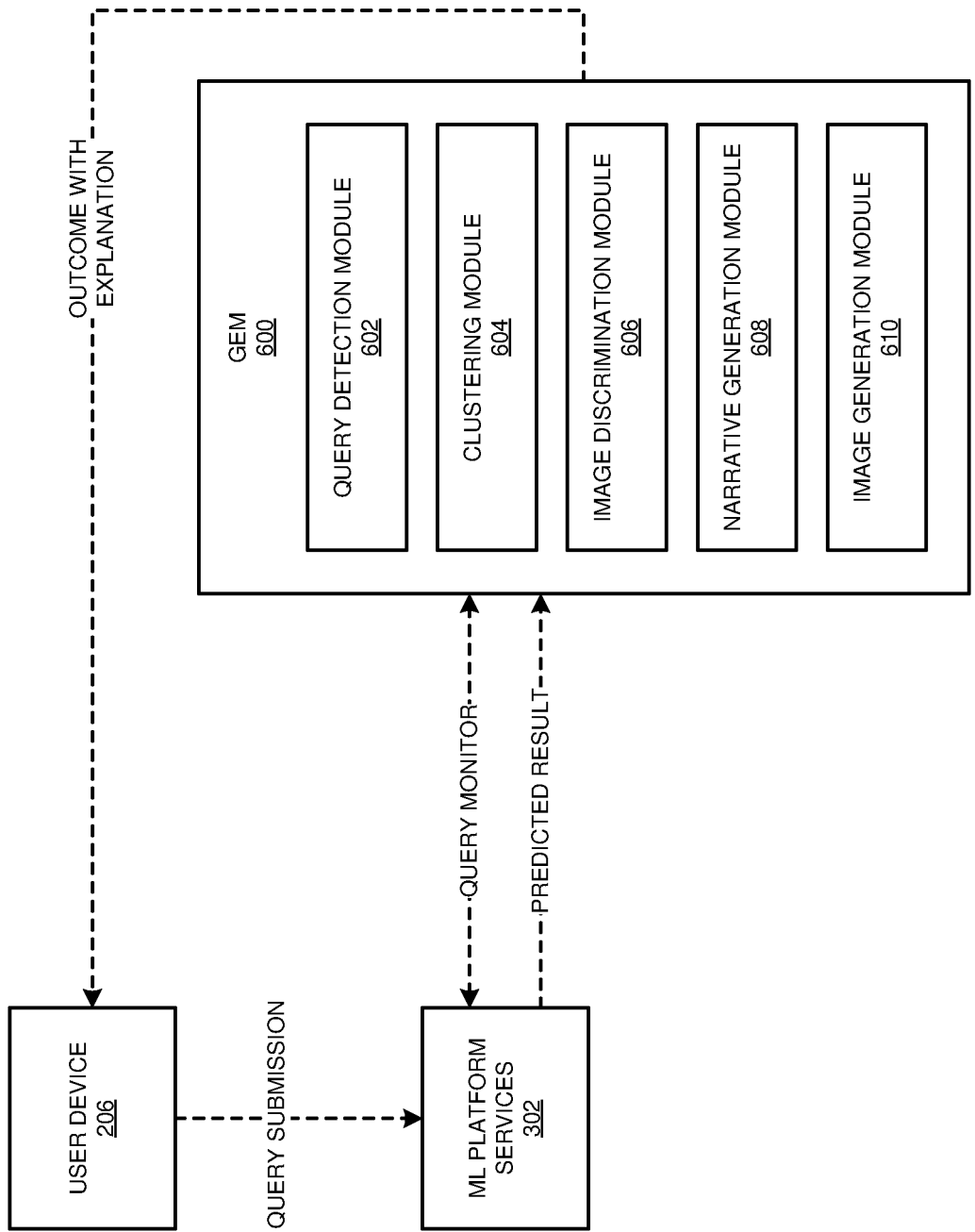
FIG. 6 depicts a functional block diagram of a GEM in accordance with an illustrative embodiment.

With reference to FIG. 6, this figure depicts a functional block diagram of a GEM 600 in accordance with an illustrative embodiment. In the illustrated embodiment, the GEM 600 includes a query detection module 602, a clustering module 604, an image discrimination module 606, a narrative generation module 608, and an image generation module 610. In alternative embodiments, the processor-based system 201 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the GEM 600 provides a graphical representation of an explanation of a predictive result generated by a ML model. In some embodiments, the GEM 600 comprises a service that runs in conjunction with ML platform services ML platform services 302 as an explainability interface. As an interface, the GEM 600 collects base information from the ML platform services 302 and saves this information to metadata mapper classes. This input information comprises active attribute values (i.e., attributes that are considered by the ML model for decision making), ML model functions, dimensions, training corpus used to make the decisions, etc. Additionally, the ML platform services 302 has passive attributes that are not considered by the ML model. The passive attributes are collected by the GEM 600 and used to provide contextual clarification when generating a graphical illustration symbolizing aspects of a ML model predictive result.

After the ML model has generated a predictive result for the query, the illustrated embodiment generates explanatory data that identifies features of the query that contributed to the predictive result. In some embodiments, the explanatory data identifies one or more of the active features of the query that most strongly contributed to the results from the ML model. In some embodiments, explanation algorithms can be used to determine features that caused the ML model to predict a particular result (e.g., using LIME or SHAP).

The explanatory analysis may be performed by the ML platform services 302 or by the GEM 600. In some embodiments, the ML platform services 302 performs the explanatory analysis and provides the results to the query detection module 602 with a query notification. In some embodiments, the explanatory analysis is performed by the GEM 600 after the ML platform services 302 has notified the query detection module 602 of a query and provided data that the GEM 600 can use to perform the explanatory analysis.

In some embodiments, the GEM 600 uses the feature importance values to identify the most influential active features on the predictive result output by the ML model. Once the GEM 600 has the active features and associated importance values, the clustering module 604 begins gathering the passive attributes. The clustering module 604 may request the passive attributes associated with a query from the ML platform services 302 or may fetch them from local storage if the GEM 600 previously retrieved and stored the passive attributes for the query.

The clustering module 604 partitions the user query data (i.e., the active and passive attributes) into a plurality of clusters. The clusters generated by the clustering module 604 are essentially attribute clusters. The attribute clusters will ultimately (potentially) be used as narration categories for generating the graphical explanation for the ML model predictive result. In some embodiments, the clustering algorithm partitions the user query data using a machine learning clustering algorithm that forms clusters based on semantic correlations. There are various known clustering algorithms that may be used by the clustering module 604, for example K-Means, K-Medians, Density-Based Spatial Clustering of Applications with Noise (DBSCAN), and Expectation-Maximization (EM) Clustering using Gaussian Mixture Models (GMM).

Figure 7:
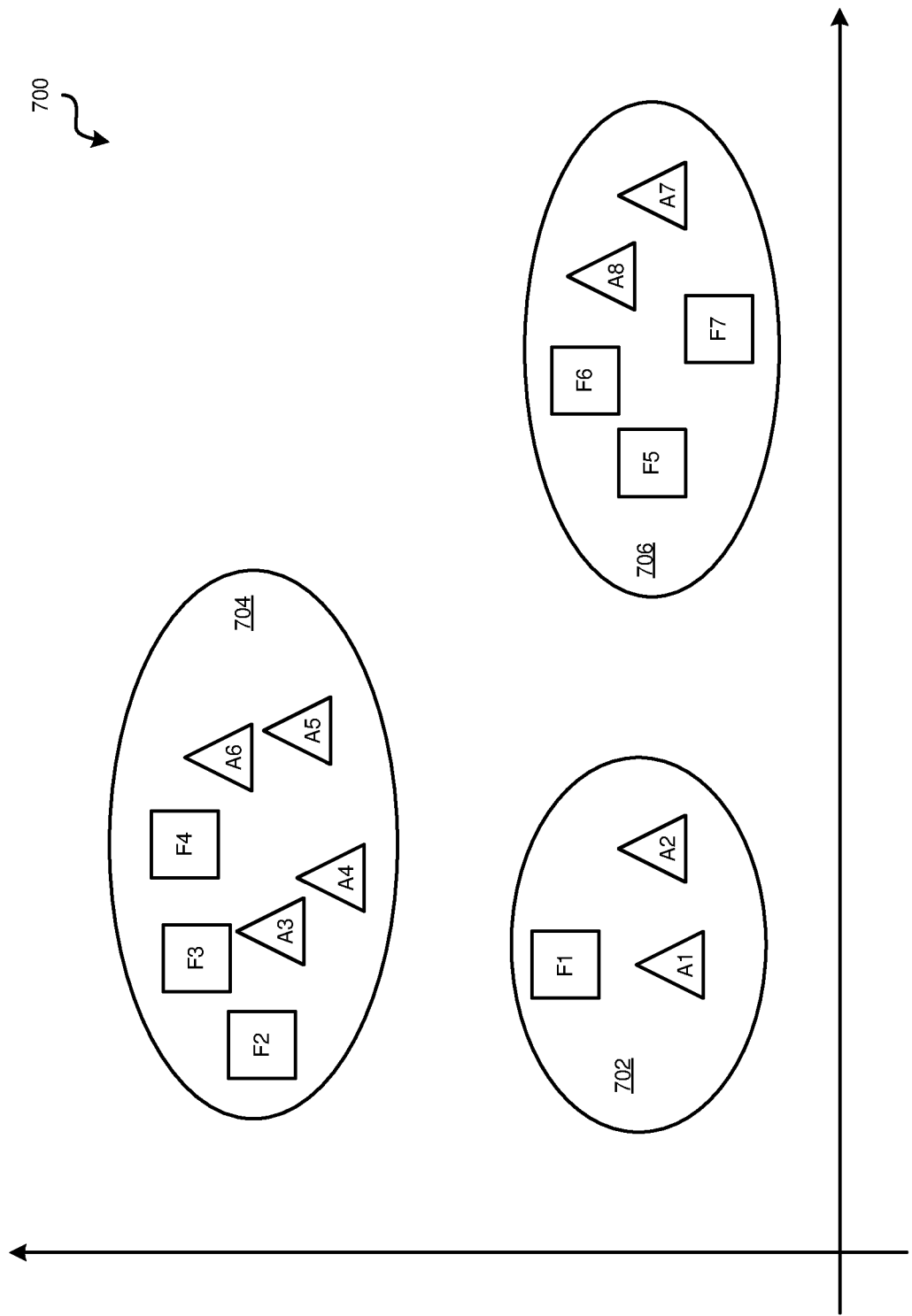
FIG. 7 depicts a block diagram of an example, non-limiting semantic space in accordance with an illustrative embodiment.

With reference to FIG. 7, this figure depicts a block diagram of an example, non-limiting semantic space 700 in accordance with an illustrative embodiment. In some embodiments, the active attributes and passive attributes are vectors that can be represented in a semantic space 700. In some embodiments, the passive attributes and active attributes are processed to generate respective vector representations of each of the passive attributes and active attributes. For example, in some embodiments, a word embedding technique that includes language modeling and feature learning techniques in natural language processing (NLP) is used to process textual passive attributes and textual active attributes by mapping the terms in the passive attributes and active attributes to vectors of real numbers in a low-dimensional space, such as the semantic space 700.

The semantic space 700 includes clusters of passive attributes A1-A8 and active attributes F1-F7. In some embodiments, the passive attributes A1-A8 and active attributes F1-F7 have been clustered by the clustering module 604 of FIG. 6. In this non-limiting example, passive attributes A1-A2 and active attribute F1 are included in cluster 702, passive attributes A3-A6 and active attributes F2-F4 are included in cluster 704, and passive attributes A7-A8 and active attributes F5-F7 are included in cluster 706. While three clusters are depicted in the example, alternative embodiments generate any suitable number of clusters. In the illustrated embodiment, the clustering algorithm (e.g., of clustering module 604) forms the clusters 702-704 based on a semantic correlation between the active feature and the passive attributes.

Referring again to FIG. 6, the image discrimination module 606 begins generating a narrative for the graphical explanation as the clusters are formed by the clustering module 604. The image discrimination module 606 begins to refine a list of attributes that will be used for generating the graphical explanation based on the importance of the attributes in the difference clusters and the predictive result by the ML model. For example, in some scenarios, a small number of very important/influential attributes drive the ML model to a predictive result that seems counter to a larger number of lesser important attributes. Including imagery in the graphical explanation that depicts representations of the large number of lesser important attributes that would appear to favor a different predictive result would appear contradictory and confusing. Therefore, the image discrimination module 606 evaluates clusters of attributes for attributes that include an attribute having a relatively high feature importance value and align with the predictive result of the ML model. Other attributes of that attribute cluster may then also be used to generate the graphical explanation of the predictive result.

In some embodiments, the image discrimination module 606 begins generating a narrative by generating digital images that will later be combined into a final graphical explanation. In some such embodiments, the image discrimination module 606 includes a Generative Adversarial Network (GAN) that generates a machine-generated digital images for the narrative using a trained neural network. In some such embodiments, the trained neural network generates digital images based on the passive attributes and the semantic correlations from the selected clusters. In some embodiments, the generating of the machine-generated digital images comprises generating the machine-generated digital images using a GAN that includes a generator and a discriminator, where the generator includes a first trained neural network as a generator neural network, and the discriminator includes a second trained neural network as a discriminator neural network.

Figure 8:
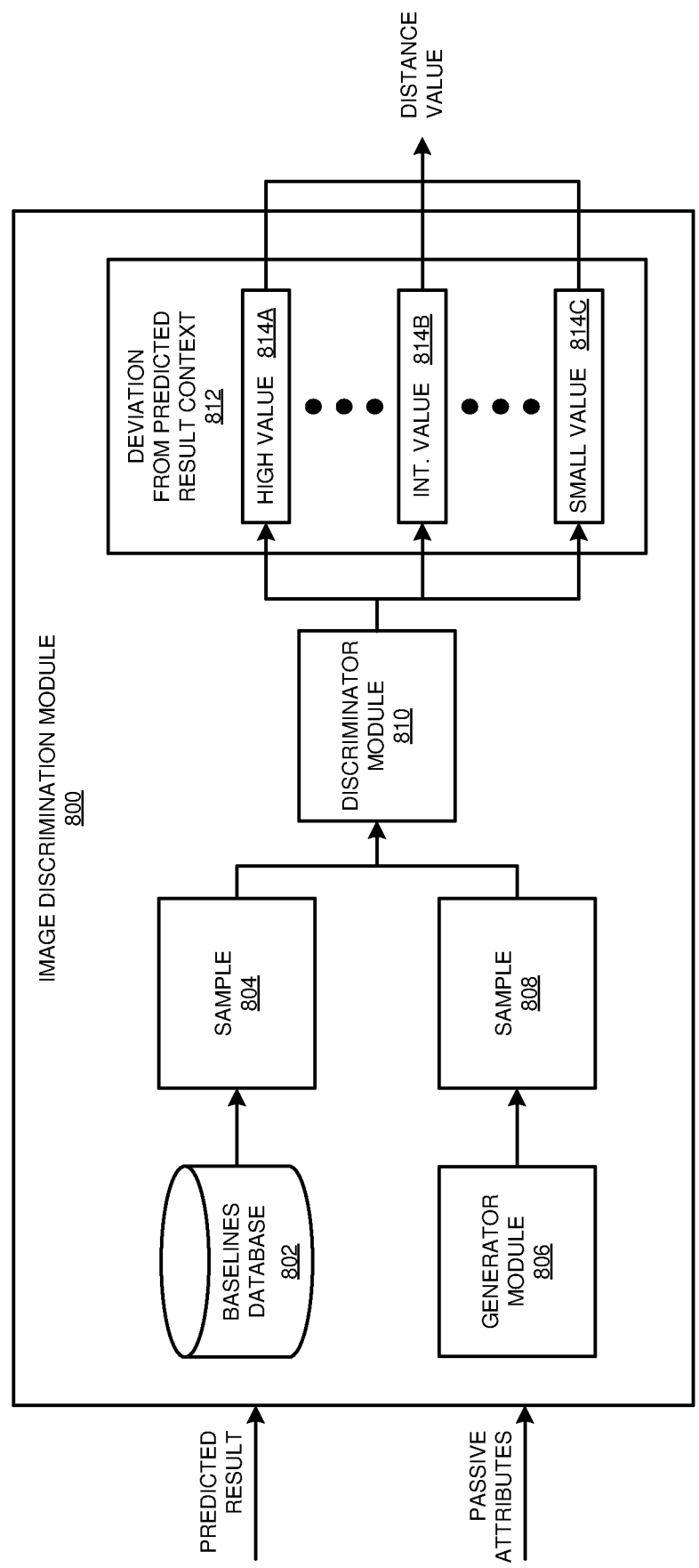
FIG. 8 depicts a functional block diagram of an exemplary image discrimination module in accordance with an illustrative embodiment.

With reference to FIG. 8, this figure depicts a functional block diagram of an exemplary image discrimination module 800 in accordance with an illustrative embodiment. In the illustrated embodiment, the image discrimination module 800 is an example of the image discrimination module 606 of FIG. 6 that includes a GAN having a generator and a discriminator.

In the illustrated embodiment, the image discrimination module 800 includes database 802, a generator module 806, a discriminator network 810, and a deviation module 812. In alternative embodiments, the image discrimination module 800 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The database 802 stores the clustering results, for example from clustering module 604 of FIG. 6, and previously used images for previously generated graphical explanations that are provided as real data for a real sample 804 to the discriminator module 810. The generator module 806 undergoes a training phase during which it is trained to provide generated or synthetic data as a generated sample 808 to the discriminator module 810. The discriminator module 810 outputs a value to predict an effectiveness of an image. In the illustrated embodiment, the discriminator module 810 predicts a value representative of an amount of deviation from the ML model's predictive result for each sample 808. For example, in some embodiments, the discriminator module 810 outputs a value representative of an amount of deviation of sample 808. In some such embodiments, the amount of deviation may be, for example, a distance that is based on a directionality value associated with active attributes in which the importance values also indicate a direction as being influential towards a particular classification or other type of predictive result. The deviation module 812 detects the amount of deviation and quantifies the amount into a value that will be meaningful as feedback for evaluating the effectiveness of an image generated by the generator module 806. For example, the deviation module 812 may classify the amount of deviation as a high value 814A, an intermediate value 814B, or a small value 814C, and output a value representative of the detected deviation classification. While three classifications 814A-814C are shown, alternative embodiments may include additional or fewer classification levels.

Referring again to FIG. 6, in some embodiments, the image discrimination module 606 trains the discriminator neural network of the GAN based on training data that comprises actual digital images and machine-generated digital images generated by the generator neural network of the GAN. In some embodiments, the image discrimination module 606 trains the generator neural network of the GAN to generate machine-generated digital images approximating actual digital images representative of inputted passive attributes. In some embodiments, the generating of the machine-generated digital image includes a process in which the generator neural network of the GAN receives a passive attribute, a semantic correlation, and at least one actual digital image. In some such embodiments, the process includes using a noise generator to inject noise into the generator machine-generated image. In some such embodiments, the generator module generates a machine-generated digital image based on a combination of the actual digital image, the passive attribute, the semantic correlation, and the noise input.

In some such embodiments, the image discrimination module 606 provides the machine-generated digital image to the discriminator neural network of the GAN. In some such embodiments, the predicted result from the ML model is also provided to the discriminator module of the GAN. In some such embodiments, the discriminator module analyzes the predicted result and the machine-generated digital image and generates a context score for the machine-generated digital image. The context score is representative of an amount of correlation between the machine-generated digital image a context of the predicted result. In some embodiments, the image discrimination module 606 compares the context score to a predetermined threshold value and either keeps or discards the machine-generated digital image based on whether the score meets the threshold requirement.

In the illustrated embodiment, the narrative generation module 608 generates outcome narrative data indicative of an explanation of the predicted result from the machine learning model, wherein the generating of the outcome narrative data is based at least in part on the active features selected by the image discrimination module 606.

In the illustrated embodiment, the image generation module 610 generates a graphical explanation of the predicted result from the machine learning model using an image generator based at least in part on the outcome narrative data and the digital images from the image discrimination module 606.

Figure 9:
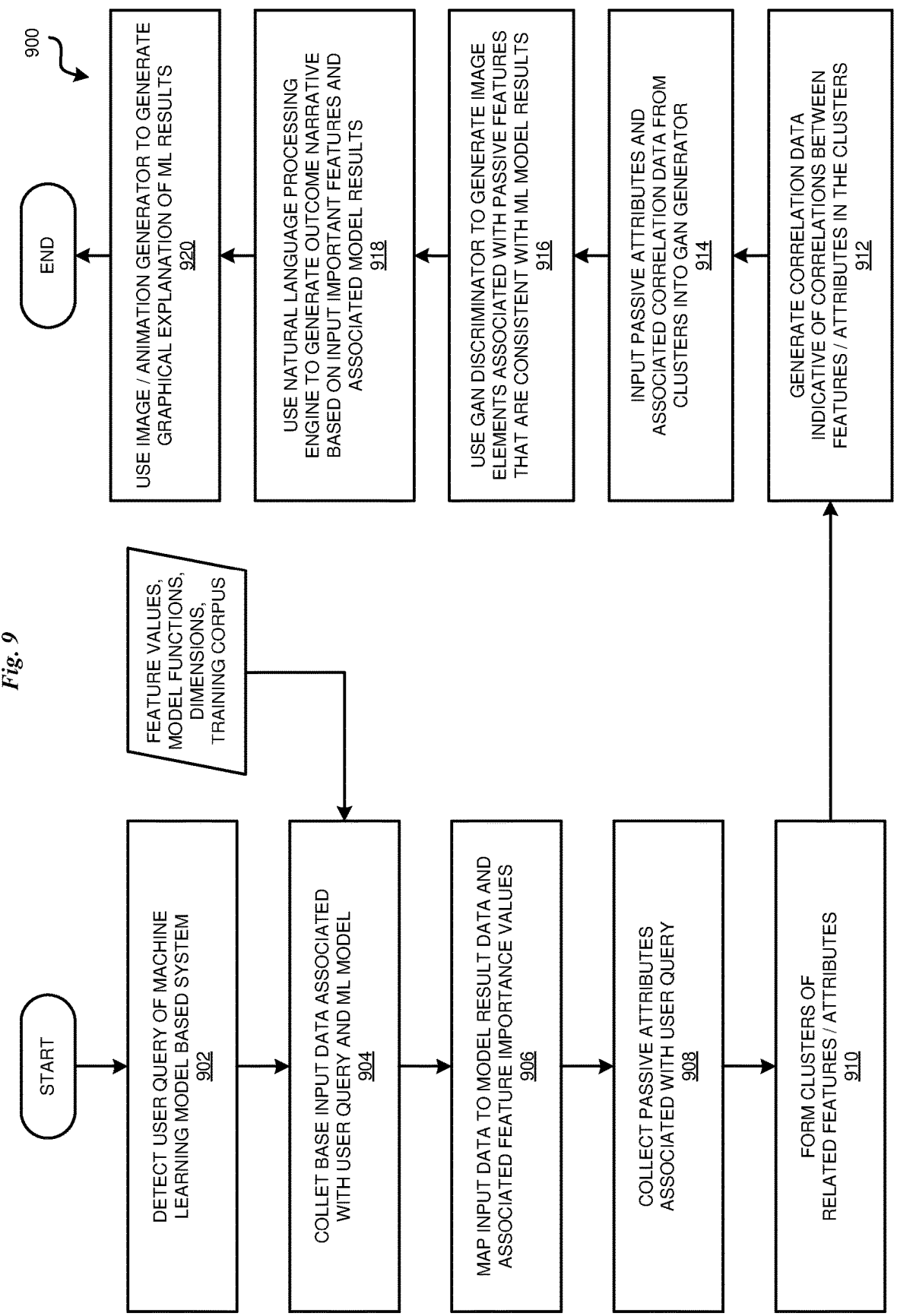
FIG. 9 depicts a flowchart of an example process for generating graphical explanations of machine learning predictions in accordance with an illustrative embodiment.

With reference to FIG. 9, this figure depicts a flowchart of an example process 900 for generating graphical explanations of machine learning predictions in accordance with an illustrative embodiment. In a particular embodiment, the GEM 200 of FIG. 2 carries out the process 900.

In the illustrated embodiment, at block 902, the process detects a user query of machine learning model-based system. Next, at block 904, the process collects base input data associated with user query and ML model. This input information comprises active attribute values (i.e., attributes that are considered by the ML model for decision making), ML model functions, dimensions, training corpus used to make the decisions, etc. Additionally, the ML model platform has passive attributes that are not considered by the ML model. The process collects the passive attributes and uses the passive attributes to provide contextual clarification when generating a graphical illustration symbolizing aspects of a ML model predictive result.

Next, at block 906, the process maps input data to model result data and associated feature importance values. In some embodiments, the process generates explanatory data that identifies active features of the query that contributed to the predictive result. In some embodiments, the explanatory data identifies one or more of the active features of the query that most strongly contributed to the results from the ML model. In some embodiments, explanation algorithms can be used to determine features that caused the ML model to predict a particular result (e.g., using LIME or SHAP).

Next, at block 908, the process collects passive attributes associated with the user query. Next, at block 910, the process forms clusters of related features/attributes.

Next, at block 912, the process generates correlation data indicative of correlations between features/attributes in the clusters. partitions the user query data (i.e., the active and passive attributes) into a plurality of clusters. In some embodiments, the process generates clusters that are essentially attribute clusters, The attribute clusters will ultimately (potentially) be used as narration categories for generating the graphical explanation for the ML model predictive result. In some embodiments, the clustering algorithm partitions the user query data using a machine learning clustering algorithm that forms clusters based on semantic correlations. There are various known clustering algorithms that may be used by the process, for example K-Means, K-Medians, Density-Based Spatial Clustering of Applications with Noise (DBSCAN), and Expectation-Maximization (EM) Clustering using Gaussian Mixture Models (GMM).

Next, at block 914, the process inputs passive attributes and associated correlation data from clusters into a GAN generator. Next, at block 916, the process uses the GAN discriminator to generate image elements associated with passive features that are consistent with ML model results. In some embodiments, the GAN generates the machine-generated digital image according to a process in which the GAN generator receives a passive attribute, a semantic correlation, and at least one actual digital image. In some such embodiments, the process includes using a noise generator to inject noise into the machine-generated image. In some such embodiments, the GAN generator generates a machine-generated digital image based on a combination of the actual digital image, the passive attribute, the semantic correlation, and the noise input.

In some such embodiments, the process provides the machine-generated digital image to the discriminator neural network of the GAN. In some such embodiments, the predicted result from the ML model is also provided to the discriminator module of the GAN. In some such embodiments, the discriminator module analyzes the predicted result and the machine- generated digital image and generates a context score for the machine-generated digital image. The context score is representative of an amount of correlation between the machine-generated digital image and a context of the predicted result. In some embodiments, the process compares the context score to a predetermined threshold value and either keeps or discards the machine-generated digital image based on whether the score meets the threshold requirement.

Next, at block 918, the process uses a natural language processing engine to generate outcome narratives based on input important features and associated model results. Next, at block 920, the process uses an image/animation generator to generate graphical explanation of ML results.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    detecting query data associated with a query, wherein the query data comprises an active feature and a passive attribute used in a machine learning model, wherein the machine learning model is trained to output a predicted result based at least in part on the active feature, the active feature comprising a first attribute that is considered in machine learning model for decision making;
    generating, using a first trained neural network, a machine-generated digital image based on (i) the passive attribute, (ii) a semantic correlation between the active feature and the passive attribute, (iii) at least one actual digital image, and (iv) a noise input;
    generating, from the machine learning model, outcome narrative data indicative of an explanation of the predicted result and based at least in part on the active feature; and
    generating, using an image generator and responsive to an amount of correlation between (i) the machine-generated digital image and (ii) a contextual clarification symbolizing an aspect of the predicted result exceeding a predetermined threshold score, a graphical explanation of the predicted result, the graphical explanation being based at least in part on the outcome narrative data and the machine-generated digital image, and wherein the graphical explanation comprises a symbolic imagery depicting the active feature.

2. The method of claim 1, further comprising:
    forming a cluster from the query data, the cluster including the active feature and the passive attribute based on the semantic correlation.

3. The method of claim 2, wherein the forming of the cluster comprises using a machine learning clustering algorithm that forms clusters based on semantic correlations.

4. The method of claim 1, wherein the generating of the machine-generated digital image comprises generating the machine-generated digital image using a Generative Adversarial Network (GAN), wherein the GAN comprises the first trained neural network.

5. The method of claim 4, wherein the GAN comprises a generator and a discriminator, wherein the generator includes the first trained neural network as a generator neural network, and wherein the discriminator includes a second trained neural network as a discriminator neural network.

6. The method of claim 5, further comprising training the discriminator neural network of the GAN based on training data, input to the discriminator neural network, comprising actual digital images and machine-generated digital images generated by the generator neural network of the GAN.

7. The method of claim 6, further comprising training the generator neural network of the GAN to generate machine-generated digital images approximating actual digital images representative of inputted passive attributes.

8. The method of claim 5, wherein the generating of the machine- generated digital image comprises:
    receiving, by the generator neural network of the GAN, the passive attribute, a semantic correlation, and at least one actual digital image;
    inputting, by a noise generator, a noise input to the generator neural network;
    generating, by the generator neural network, the machine-generated digital image; and
    providing the machine-generated digital image to the discriminator neural network of the GAN.

9. The method of claim 8, wherein the generating of the machine-generated digital image further comprises:
    providing the predicted result to the discriminator neural network of the GAN; and
    analyzing, by the discriminator neural network, the predicted result and the machine-generated digital image, the analyzing including generating a context score for the machine-generated digital image, wherein the context score is representative of the amount of correlation between the machine-generated digital image the context of the predicted result.

10. The method of claim 9, further comprising:
    generating, by the generator neural network, a second machine-generated digital image based at least in part on a second passive attribute from the query data;
    providing the second machine-generated digital image to the discriminator neural network of the GAN;
    generating, by the discriminator neural network, a second context score for the second machine-generated digital image; and
    discarding the second machine-generated digital image based at least in part on the second context score being below the predetermined threshold score.

11. A computer program product comprising one or more computer readable storage media, and program instructions collectively stored on the one or more computer readable storage media, the program instructions executable by a processor to cause the processor to perform operations comprising:
    detecting query data associated with a query, wherein the query data comprises an active feature and a passive attribute used in a machine learning model, wherein the machine learning model is trained to output a predicted result based at least in part on the active feature, the active feature comprising a first attribute that is considered in machine learning model for decision making;
    generating, using a first trained neural network, a machine-generated digital image based on (i) the passive attribute, (ii) a semantic correlation between the active feature and the passive attribute, (iii) at least one actual digital image, and (iv) a noise input;
    generating, from the machine learning model, outcome narrative data indicative of an explanation of the predicted result and based at least in part on the active feature; and
    generating, using an image generator and responsive to an amount of correlation between (i) the machine-generated digital image and (ii) a contextual clarification symbolizing an aspect of the predicted result exceeding a predetermined threshold score, a graphical explanation of the predicted result, the graphical explanation being based at least in part on the outcome narrative data and the machine-generated digital image, and wherein the graphical explanation comprises a symbolic imagery depicting the active feature.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

14. The computer program product of claim 11, further comprising:
forming a cluster from the query data, the cluster including the active feature and the passive attribute based on the semantic correlation.

15. The computer program product of claim 11, wherein the generating of the machine-generated digital image comprises generating the machine-generated digital image using a Generative Adversarial Network (GAN), wherein the GAN comprises the first trained neural network.

16. The computer program product of claim 15, wherein the GAN comprises a generator and a discriminator, wherein the generator includes the first trained neural network as a generator neural network, and wherein the discriminator includes a second trained neural network as a discriminator neural network.

17. A computer system comprising a processor and one or more computer readable storage media, and program instructions collectively stored on the one or more computer readable storage media, the program instructions executable by the processor to cause the processor to perform operations comprising:
detecting query data associated with a query, wherein the query data comprises an active feature and a passive attribute used in a machine learning model, wherein the machine learning model is trained to output a predicted result based at least in part on the active feature, the active feature comprising a first attribute that is considered in machine learning model for decision making;
generating, using a first trained neural network, a machine-generated digital image based on (i) the passive attribute, (ii) a semantic correlation between the active feature and the passive attribute, (iii) at least one actual digital image, and (iv) a noise input;
generating, from the machine learning model, outcome narrative data indicative of an explanation of the predicted result and based at least in part on the active feature; and
generating, using an image generator and responsive to an amount of correlation between (i) the machine-generated digital image and (ii) a contextual clarification symbolizing an aspect of the predicted result exceeding a predetermined threshold score, a graphical explanation of the predicted result, the graphical explanation being based at least in part on the outcome narrative data and the machine-generated digital image, and wherein the graphical explanation comprises a symbolic imagery depicting the active feature.

18. The computer system of claim 17, further comprising:
forming a cluster from the query data, the cluster including the active feature and the passive attribute based on the semantic correlation.

19. The computer system of claim 17, wherein the generating of the machine- generated digital image comprises generating the machine-generated digital image using a Generative Adversarial Network (GAN), wherein the GAN comprises the first trained neural network.

20. The computer system of claim 19, wherein the GAN comprises a generator and a discriminator, wherein the generator includes the first trained neural network as a generator neural network, and wherein the discriminator includes a second trained neural network as a discriminator neural network.

* * * * *